Patented Nov. 14, 1933

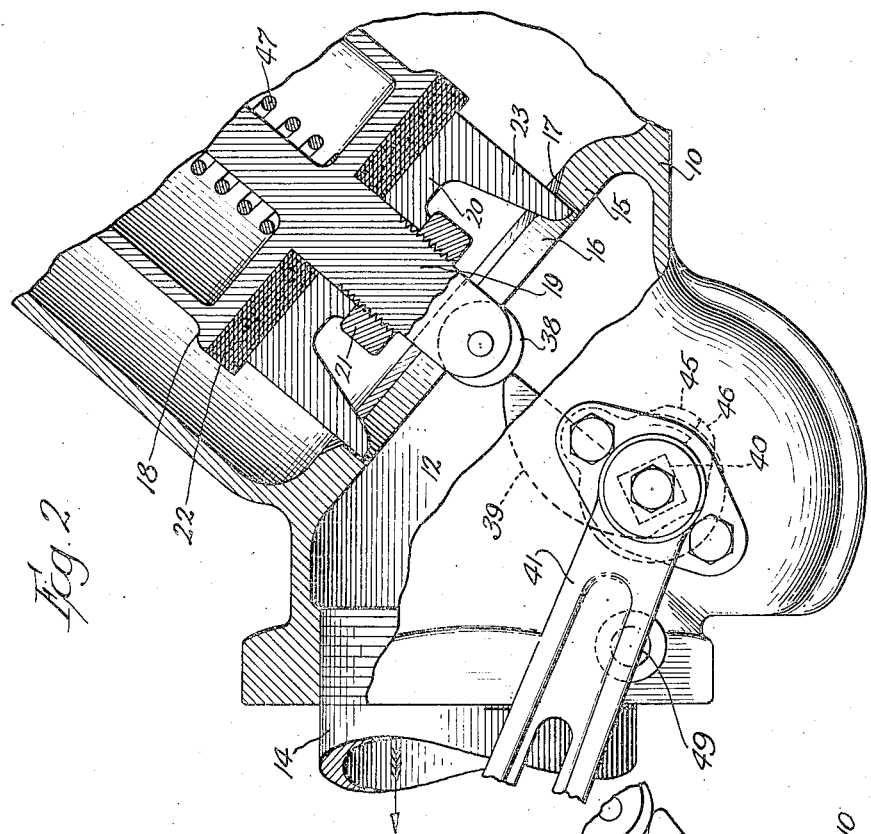
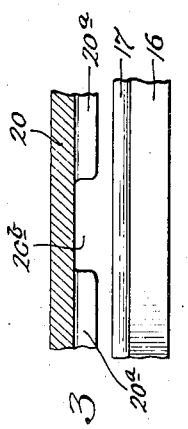
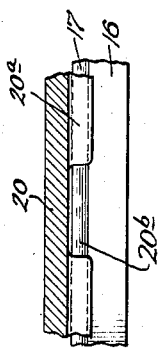
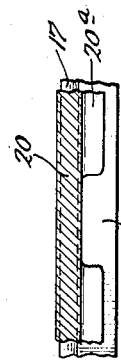
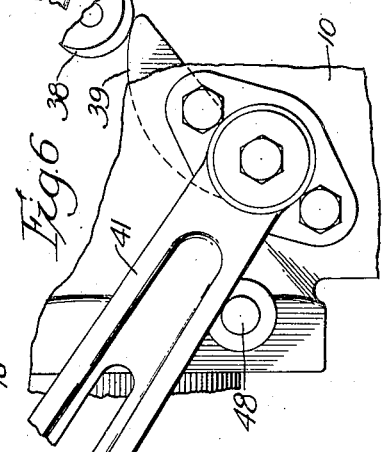

1,935,299

UNITED STATES PATENT OFFICE 1,935,299

SLOW CLOSING VALVE

Walter Siegert, Dubuque, Iowa, assignor to A. Y. McDonald Mfg. Co., Dubuque, Iowa, a corporation of Iowa Application January 4, 1932. Serial No. 584,606

9 Claims. (Cl. 251—143)

An object of this invention is to provide a valve which is self-closing, slow-closing with means for regulating the speed of closing, and which is particularly adapted to be used on long pipe lines, such as are used for carrying or transporting oil, gasoline, water, or other liquids. When such a line is long the inertia of the moving column of liquid is very great, and when this long column is to be brought to rest, as on closing a valve in the pipe line, some provision must be made to accomplish this slowly so as to prevent "water-hammer" in the line which might break the line or fittings.

Another object is to provide a valve of this kind which is easy opening, and which may be locked in either open or closed position.

These and other objects, as will hereinafter appear, are accomplished by this invention which is fully described in the following specification and shown in the accompanying drawings, in which—

Fig. 2 is a fragmentary view of the valve in open position, shown partly in elevation and partly in central longitudinal section;

Figs. 3, 4 and 5 are developed views as viewed on the line 3 of Fig. 1 showing the overlapping edges of the valve seat and of the apron of the valve which passes inside of it; and Fig. 6 is a partial view similar to Fig. 2 showing a stop for the lever.

Figure 1:
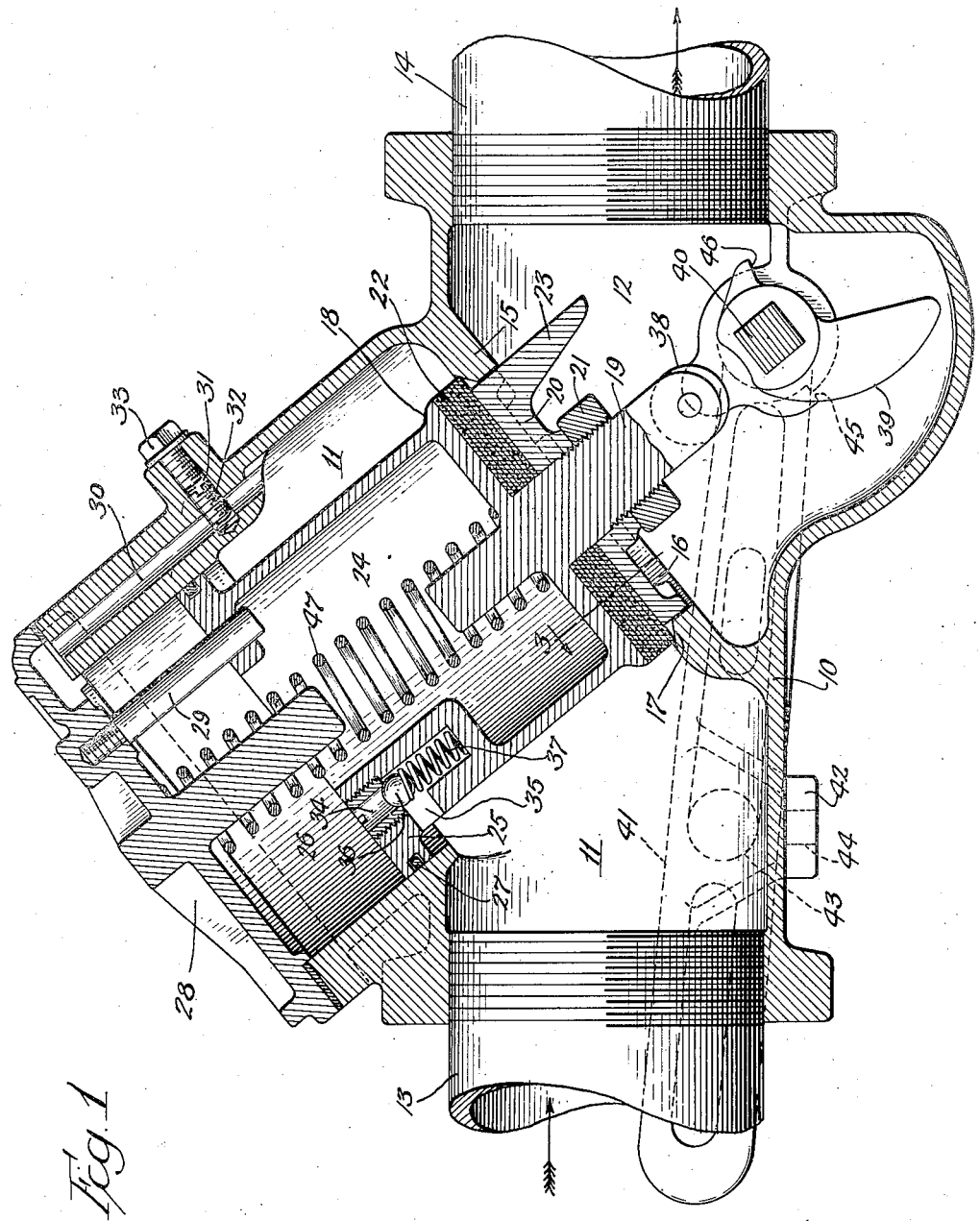
Figure 1 is a longitudinal section through the present valve shown in closed position, with one of the guides therefor removed from the view.

The embodiment illustrated comprises a valve having a cast metal body 10, at opposite ends of which are formed inlet and outlet chambers 11 and 12, respectively. These chambers are provided with openings which are preferably in axial alignment, and which are threaded to receive inlet and outlet pipes 13, 14. Between the chambers 11 and 12 lies a partition 15 which is preferably set at an angle of 45° to the longitudinal axis of the inlet and outlet pipes. This partition is provided with a cylindrical opening 16 which is beveled on the inlet inside at 17 to provide a valve seat.

A valve is provided to co-operate with this valve seat to close the same, and this comprises a shouldered valve frame 18 having a reduced central axial extension 19, over which is slid a disk-like member 20 which is secured in place by a nut 21 secured on the threaded extension 19. A valve member 22 of a suitable metal, alloy, or other composition, is secured between the valve frame 18 and the member 20, this member having a plurality of extensions 23 which serve as guides in the opening 16 through which the member 20 is adapted to pass back and forth as the valve is opened and closed. The opposite end of the valve frame 18, which is hollow to provide a valve compartment 24, has an outwardly extending flange 25 which acts as a piston, and which is fitted in a cylindrical bore 26 in the inlet end of the valve body. The flange 25 is provided with one or more piston rings 27, or other suitable forms of packing so as to make a reasonably tight liquid-proof joint.

The outer end of the cylinder bore 26 is closed by means of a cylinder head 28 which is secured thereon by means of bolts, screws, or the like (not shown). A pin 29 is secured eccentrically within the head 28 and passes through an opening in the valve frame 18. This acts as a guide for the valve frame and prevents it from rotating on its axis. The cylinder bore 26 communicates with the chamber 11 through a passage 30. A transverse hole 31 lies across this passage, and in this is placed an adjusting screw 32 which serves to adjustably restrict the flow of fluid through this passage. A screw 33 serves to close the outer end of the hole 31 so as to prevent the adjusting screw 32 being tampered with except when the screw 33 is removed. The cylinder bore 26 also communicates with the chamber 11 through a hollow screw member 34 and a passage 35. In this passage lies a ball 36 which is normally pressed against the opening in the hollow screw member so as to close the same by means of a spring 37.

The end of the extension 19 is preferably bifurcated to receive a roller 38 which is adapted to serve as a follower for a cam 39 which is mounted on a shaft 40, which is suitably journaled in the walls of the outlet chamber 12. This cam has a generally parabolic contour which gives a slow opening with high maximum pressure exerted at first to overcome the opening load with increased speed as the valve rises. This shaft is provided with an operating lever 41 which, in its inoperative position as shown in Fig. 1, is in contact with a lug 42. The operating lever and lug are provided with suitable holes 43, 44, respectively, through which may be inserted the hasp of a lock (not shown) in order to provide a ready means for locking this lever in the inoperative position in which the valve is closed, thereby preventing unauthorized persons from tampering with the valve. The interior of the chamber 12 is provided with an ear 45 which is adapted to engage an ear 46 on the side of the cam 39 in order to prevent being thrown beyond a predetermined point when opened, as shown in Fig. 2.

Thus it will be seen that with the valve in closed position, as shown in Fig. 1, to open the valve the lever 41 is turned in a clockwise direction until the face of the cam 39 contacts the roller 38, thereby lifting the valve off the valve seat. It will be understood that in this closed position the chamber 11 will be under pressure of the liquid from the inlet pipe 13, and that this pressure is exerted against the valve itself through the passage 30. When, therefore, the valve is raised it must be raised against the action of this pressure as well as against the action of the spring 47, which constantly tends to force the valve to closed position. The moment, however, the valve 22 begins to rise pressure within the cylinder bore 26 increases, thereby forcing the ball valve 36 off its seat, and liquid within the cylinder bore will flow out into the inlet chamber 11. Thus the valve may be rapidly opened but will be slow-closing, as will now be pointed out.

With the parts in the position shown in Fig. 2 any movement of the lever 41 in a clockwise direction will cause the valve 22 to be returned toward its seat under the action of the spring 47. This movement, however, is retarded by the vacuum which is formed within the cylinder bore, and which is overcome only as rapidly as fluid can pass through the passage 30, and this in turn is regulated by the position of the adjusting screw 32, this rate of flow being controlled also by the viscosity of the liquid. In this way the valve is closed very slowly, the time of closing being regulated by means of the adjusting screw 32, and the danger of "water-hammer" which is always present in long lines of pipe is avoided.

In order to further slow up the flow through the main valve just before it is closed, I have provided the disk-like member 20 (see Figs. 3, 4 and 5) with a discontinuous apron or spaced apart apron portions 20ª which passes into the cylindrical opening 16, thereby shutting off the portions of the cylindrical opening which are thus covered up, and leaving only passages 20ᵇ which occupy about one-third of the circumference of the opening. It will be clear from the foregoing that at no time during the closing of the valve is there a sudden check in the rate of flow of the liquid which is passing therethrough, but on the contrary this flow is brought to a standstill by very slow degrees so that at no time is there generated an excessive pressure inertia of the moving body of liquid.

For certain purposes it may not be desirable to have the cam 39 throw as far over as is indicated in Fig. 2, and for that reason a stop pin 48 may be inserted in the hole 49 in the body, as shown in Fig. 6, so that the lever 41 may stop short of dead-center. One reason for doing this is for the purpose of safety. With the pin in such a position the lever 41 could never be thrown beyond the dead-center of the roller 38, and consequently the valve would not remain open. The operator in using this valve would necessarily have to hold the valve in open position by hand. The moment he released the operating lever, the valve acting under the pressure of the spring 47 and of the fluid within the inlet pipe in the chamber would be returned slowly to closed position.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:

1. In a valve, a valve body having inlet and outlet chambers, a partition extending at an angle of substantially 45° between the chambers, said partition having an opening whose edge serves as a valve seat, a cylinder in alignment with the seat and integral therewith, a valve adapted to close the seat and guided therein, a valve frame secured at one end to the valve and at the other being slidably fitted within the cylinder, a head for closing the outer end of the cylinder, a spring between the head and valve for urging the valve toward closed position, means for quickly opening the valve, and means for causing slow closing of the same.

2. In a valve, a valve body having inlet and outlet chambers, a partition extending at an angle of substantially 45° between the chambers, said partition having an opening whose edge serves as a valve seat, a cylinder in alignment with the seat and integral therewith, a valve adapted to close the seat and guided therein, a valve frame secured at one end to the valve and at the other being slidably fitted within the cylinder, a head for closing the outer end of the cylinder, a spring between the head and valve for urging the valve toward closed position, means including a valve-operating member in the outlet chamber for quickly opening the valve, and means for causing slow closing of the same.

3. In a valve, a valve body having inlet and outlet chambers, a partition extending at an angle of substantially 45° between the chambers, said partition having an opening whose edge serves as a valve seat, a cylinder in alignment with the seat and integral therewith, a valve adapted to close the seat and guided therein, a valve frame secured at one end to the valve and at the other being slidably fitted within the cylinder, a head for closing the outer end of the cylinder, a spring between the head and valve for urging the valve toward closed position, means for quickly opening the valve, and means for causing slow closing of the same, the pressure in the inlet chamber tending to force said valve on its seat.

4. In a valve, a valve body having inlet and outlet chambers, a partition extending at an angle of substantially 45° between the chambers, said partition having an opening whose edge serves as a valve seat, a cylinder in alignment with the seat and integral therewith, a valve adapted to close the seat and guided therein, a valve frame secured at one end to the valve and at the other being slidably fitted within the cylinder, a head for closing the outer end of the cylinder, a spring between the head and valve for urging the valve toward closed position, an extension extending from the valve into the outlet chamber, a cam in said chamber adapted to bear on said extension to force the valve off its seat, an operating lever connected to said cam and extending outside said valve body, and means for causing the valve to return slowly to its seat.

5. In a slow-closing valve the combination of a body formed to provide aligned inlet and outlet chambers and a cylinder having its axis angled at about 45° in relation to the axes of the two chambers and opening onto one of them, a wall transversely of the cylinder axis separating the inlet and outlet chambers and formed therethrough with an opening providing a valve seat, a hollow piston open toward the cylinder head and closed at the other end reciprocable within the cylinder, a valve member carried at the closed end of the piston in co-acting relation with the valve seat adapted to open and close the opening therethrough, spring means normally urging the valve member to its seat, a restricted passage in the walls of the body between the inlet chamber and the head end of the cylinder, means adjustable from the exterior of the valve body for regulating the passage of fluid through the restricted passage, a port through the piston affording communication between the head end of the cylinder and the inlet chamber, a spring-actuated check valve normally closing the port except when the pressure of fluid at the head of the cylinder exceeds that in the inlet chamber, and cam means operable from the exterior of the valve body for moving the valve from its seat and the piston toward the head of the cylinder whereby to open communication in a straight line between the inlet and outlet chambers.

6. In a slow-closing valve the combination of a body formed to provide aligned inlet and outlet chambers between which is a valve seat having a through opening affording a straight line communication between the two chambers, a dash pot mechanism including a cylinder wherein is a reciprocable hollow piston having an open end facing the cylinder head and a closed end facing the valve seat, and a valve member coacting with the valve seat fitted against the closed end of the piston and movable therewith under control of the dash pot mechanism to open and close communication between the inlet and outlet chambers.

7. In a slow-closing valve the combination of a body formed to provide aligned inlet and outlet chambers between which is a valve seat having a through opening affording a straight line communication between the two chambers, a dash pot mechanism including a cylinder wherein is a reciprocable hollow piston having an open end facing the cylinder head and a closed end facing the valve seat, a valve member coacting with the valve seat fitted against the closed end of the piston and movable therewith under control of the dash pot mechanism to open and close communication between the inlet and outlet chambers, and means operable from the exterior of the valve body for regulating the action of the dash pot mechanism.

8. In a slow-closing valve the combination of a body formed to provide aligned inlet and outlet chambers between which is a valve seat having a through opening affording a straight line communication between the two chambers, a dash pot mechanism including a cylinder wherein is a reciprocable hollow piston having an open end facing the cylinder head and a closed end facing the valve seat, a valve member coacting at its edges with the valve seat fitted against the closed end of the piston and movable therewith under control of the dash pot mechanism to open and close communication between the inlet and outlet chambers, and a disk tightened against the side of the valve member opposite the piston end and serving therewith to confine the valve member between opposing surfaces withal permitting engagement of its edges with the valve seat.

9. In a slow-closing valve, the combination of a body formed to provide inlet and outlet chambers and a cylinder having its axis angled at about 45° in relation to the axis of the inlet chamber and opening at one end thereon, a wall transversely of the cylinder axis separating the inlet and outlet chambers and formed therethrough with an opening providing a valve seat, a dash pot mechanism which includes a hollow piston reciprocable within the cylinder and provided with an open end facing the cylinder head and a closed end facing the valve seat, a valve member coacting with the valve seat fitted against the closed end of the piston and movable therewith under control of the dash pot mechanism to open and close communication between the inlet and outlet chambers, a coiled spring within the piston exerting opposite thrusts against its closed end and the cylinder head whereby to urge the valve toward its seat, and means operable from the exterior of the valve body for controlling the action of the dash pot mechanism.

WALTER SIEGERT.